United States Patent [19] Brickman et al.

[11] 3,806,888

[45] Apr. 23, 1974

[54] HIERARCHIAL MEMORY SYSTEM

[75] Inventors: Norman Frederick Brickman; Fred Elias Sakalay, both of Poughkeepsie, N.Y.

[73] Assignee: International Business Machines Corporation, Armonk, N.Y.

[22] Filed: Dec. 4, 1972

[21] Appl. No.: 312,086

[52] U.S. Cl. .......... 340/172.5
[51] Int. Cl. .......... G06f 3/06, G06f 13/08
[58] Field of Search .......... 340/172.5

[56] References Cited

UNITED STATES PATENTS

| | | | |
|---|---|---|---|
| 3,685,020 | 8/1972 | Meade | 340/172.5 |
| 3,588,839 | 6/1971 | Belady et al. | 340/172.5 |
| 3,588,829 | 6/1971 | Boland et al. | 340/172.5 |
| 3,436,734 | 4/1969 | Pomerene et al. | 340/172.5 |
| 3,248,702 | 4/1966 | Kilburn et al. | 340/172.5 |
| 3,218,611 | 11/1965 | Kilburn et al. | 340/172.5 |
| 3,723,976 | 3/1973 | Alvarez et al. | 340/172.5 |
| 3,693,165 | 9/1972 | Reiley et al. | 340/172.5 |
| 3,647,348 | 3/1972 | Smith et al. | 340/172.5 |
| 3,609,665 | 9/1971 | Kronitz et al. | 340/172.5 |
| 3,699,533 | 10/1972 | Hunter | 340/172.5 |
| 3,701,107 | 10/1972 | Williams | 340/172.5 |
| 3,705,388 | 12/1972 | Nishimoto | 340/172.5 |

OTHER PUBLICATIONS

D. H. Gibson, "Considerations in Block-Oriented Systems Design," Proc. of the SJCC, 1967, pp. 75–80.

D. H. Gibson, W. L. Shevel, "Cache Turns Up a Treasure," Electronics, October 13, 1969, pp. 105–107.

W. Anacker, "Memory Employing Integrated Circuit Shift Register Rings," IBM Tech. Disclosure Bulletin, V11/No. 9, June 1968, pp. 12–13.

J. S. Liptax, "Structural Aspects of the System B60 Model 85: The Cache," IBM Systems Journal, V7/No. 1, 1968, pp. 15–21.

*Primary Examiner*—Paul J. Henon
*Assistant Examiner*—Jan E. Rhoads
*Attorney, Agent, or Firm*—Thomas F. Galvin

[57] ABSTRACT

A large capacity, low speed backing store is organized to allow for high speed transfer of a block (page) of data to a cache associated with the Central Processing Unit (CPU). When a word is called out by the CPU, the other words in the same page are sequentially transferred to the intermediate buffer cache under the control of a ring circuit associated with the backing store. The first word transferred is the only word which must be specifically requested by the CPU; the transfer is accomplished at high speed within approximately the same machine time that the requested word is transferred from the backing store to the CPU.

15 Claims, 4 Drawing Figures

HIERARCHIAL MEMORY SYSTEM

BACKGROUND OF THE INVENTION

1. Field of the Invention

This invention relates to data processing systems having a memory hierarchy.

2. Description of the Prior Art

The demand for increased speed and size in computer systems has resulted in corresponding demands on the storage systems. No single technology can fulfil the speed and capacity requirements of storage systems at an acceptable cost-performance level; therefore storage hierarchies which use a variety of technologies have been developed.

In an electronic computer using a standard memory, the overall computer speed is limited by the speed at which data and instructions may be retrieved from the memory. On the other hand, the arithmetic units are capable of operating much faster than the memory units, even those which are extremely fast and of high cost. Moreover, in memories of extremely large capacity, say 10 million bits or more, the overall cost of extremely fast memories is prohibitive.

Designers in this field have arrived at a number of solutions to the problem of matching low speed memories with high speed processors. One such technique encompasses a data processing system which has a plurality of interleaved memory modules and a system for controlling the use of the modules by other units of the data processing system. Requests for access to the individual modules are supplied on successive machine cycles. When a module is busy, a request may be rejected into a temporary storage register which reapplies the request when the module is not busy. When a large number of interleaved modules are employed, as is the case with large storage systems, a complex, sophisticated and expensive control system is required to optimize the use of the memories.

Another hierarchy system which has enjoyed great commercial success is the "Cache" used in the IBM Model 360/85 computer. In this system two memories, one a small fast buffer to match the speed of the processor, the other a large and relatively slow storage system, are used. The latter is a backing store which is organized to transfer large batches of data into the buffer store in a single cycle. Thus, the two memories have approximately equal band widths, but their cycle times differ by a factor of an order of magnitude. In the Model 360/85 the cache or buffer is a monolithic semiconductor memory operating 12 times as fast as the backing store.

The cache is a form of buffer, which is physically part of the processor, making immediately available to the processor that pool of information which is currently in use. Its effectiveness depends on the probability that, when information is obtained from a particular location in a memory, a nearby location will be addressed soon after.

The cache automatically retains the information most recently taken from memory, together with immediately adjacent information, on the assumption that data in that page will shortly be used again. Then pages are moved automatically under hardware control between the faster cache and the slower, backing memory so that the cache is completely invisible to the user. Even in the Model 360/85 however, the backing store is interleaved four ways to allow the time slot of the store to temporarily match that of the cache. In the actual system, with interleaving, a request for data from the main memory produces two 72-bit words or 16 8-bit words from the first module, 960 nanoseconds after the request is issued; it also automatically triggers interleaved requests for data in the other three modules and this other data arrives in 16 byte groups at 80 nsec. intervals. But no single module can be accessed a second time before the end of this 960 nanosecond cycle. Therefore, only four 16 byte groups can be transferred during a cycle time of 960 nsec.

SUMMARY OF THE INVENTION

It is, therefore, a primary object of this invention to provide an improved cache memory in a computer system.

It is another object of this invention to improve the speed of transfer between the main memory backing store and the data processor.

It is a further object of this invention to transfer a page of data from the backing store to a cache buffer, in approximately the same time that previous systems would have taken to transfer one word, and without increasing the size of the bus between the backing store and the cache.

In accordance with these and other objects of the invention we provide a backing store organization to improve high speed block transfer operations. When a word is called out by the CPU, the other words in the block (page) are sequentially transferred to the cache by means of a ring circuit operating independently of the CPU during the cycle time of the backing store.

In the preferred embodiment, the backing store comprises a set of memory cards on each of which are mounted an equal number of semiconductor storage devices. The addressing is such that each card represents a single bit position in the data word; and an entire page of data words is addressed simultaneously when the CPU calls for a word. Associated with each card are fetch registers for temporarily storing information at addressed locations in the semiconductor devices and a ring circuit and output control circuits for sequentially transferring the page of words to the cache along a bus which is one word wide.

DESCRIPTION OF THE PREFERRED EMBODIMENT

Figure 1:
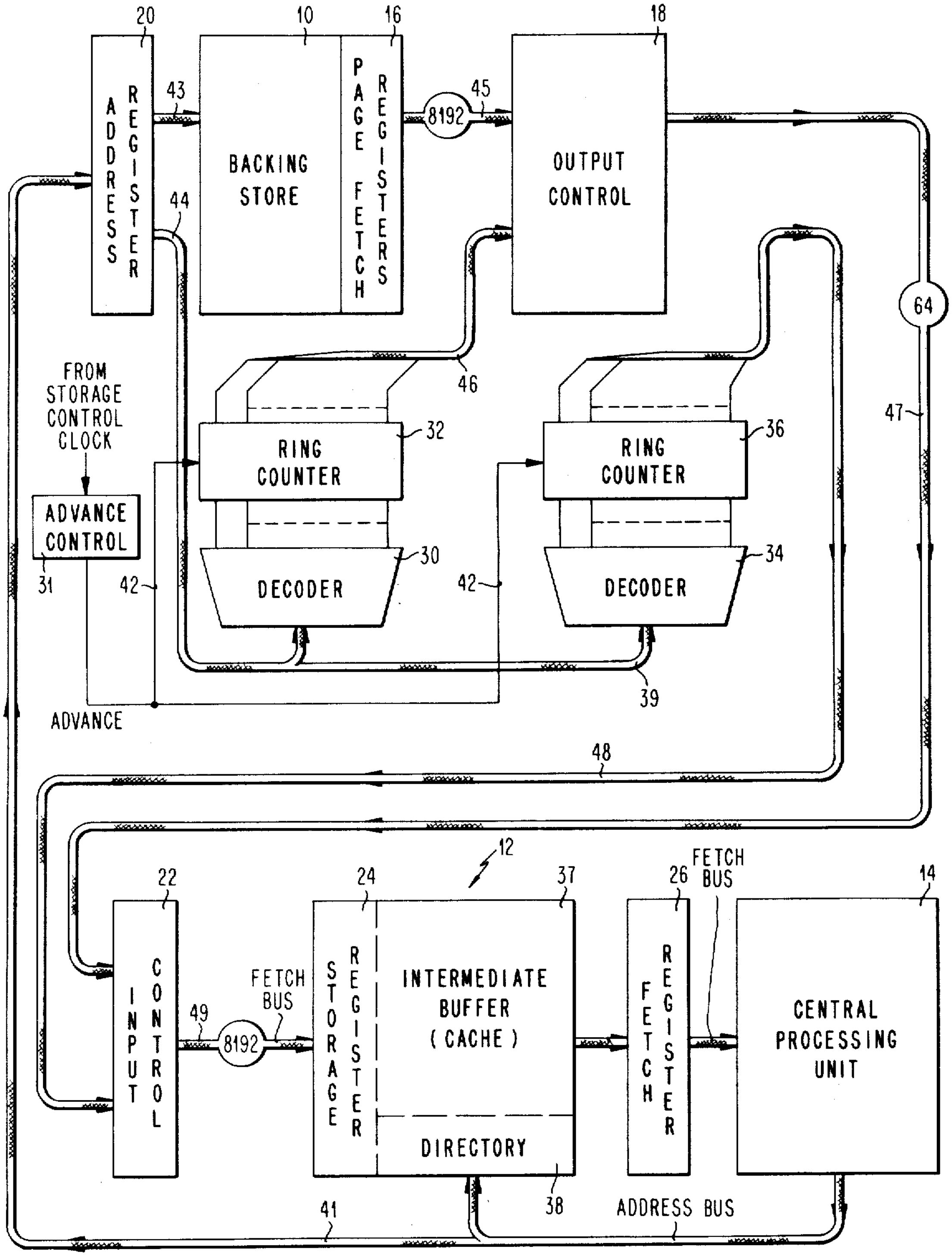
FIG. 1 is a block schematic diagram of a computer system which illustrates the invention.

Referring now to FIG. 1, there is depicted schematically a representation of a three dimensional semiconductor memory array 10 with an associated address register 20 which is operative in response to signals emanating from a central processing unit (CPU) 14. When access to data in the backing store 10 is desired, a number of address bits will have been provided in the address register 20. In most prior art systems all of the address bits from address register 20 would be transferred to decoding circuits associated with the backing store to drive one out of a plurality of bits in the backing store, thereby causing the information in that particular word location to be read out into the data processing system.

In the present invention however only a portion of the bits, those which appear in cable 43, are directly used to address the selected bit locations. Another portion are sent to a decoder 30 along cable 44 which provides starting address inputs to a high speed ring counter 32.

Integrally associated with the backing store are page fetch registers 16 which are arranged to temporarily store the information in every bit location which is addressed by the address register 20 through cabling 43. In the preferred embodiment of this invention, each location in the backing store 10 which is so addressed has associated therewith a register 16. The signals held in the page fetch registers 16, representing a page of data, are inputs to an output control circuit 18. Ring counter 32 sequentially gates the data from the output control block onto a bus 47 to the input control 22 of an intermediate buffer, or cache, 12. An advance signal on line 42 sequentially advances the ring counter, and therefore the output control circuit 18, to gate all of the information contained in the backing store serially by word along bus 47 to buffer 12. The advance signal emanates from an advance control circuit 31 which is gated by a signal from the control clock associated with the backing store 10. The control clock signal operates at the cycle speed of the backing store, which, in the present system, is in the order of 1–2 microseconds. Advance control circuit 31 is preferably an oscillator which outputs a series of pulses which act as ADVANCE signals to ring counter 32. At the present state of the art the advance pulses might be spaced 10 nanoseconds apart to drive the high speed ring counter at that speed.

Decoder 34 and ring counter 36, operating in conjunction with decoder 30 and ring counter 32, are associated with the cache input control 22 for gating the data in the input control 22 over fetch bus 49 for a temporary storage in storage registers 24 of the cache. Decoder 34 and ring counter 36 are optional and may be dispensed with.

The cache system 12 is illustrated as also including a page directory 38 which is addressable by CPU 14. The function of the directory is known to those in the high speed computer field as being used to indicate whether the word selected by the CPU is contained within the cache 37 proper. If the word is contained within the cache proper it is transmitted to the CPU over the fetch bus via fetch register 26. The Page transfer operation of this invention would then not be initiated. As previously mentioned, the cache is a form of buffer which is usually physically part of the CPU. The function of the cache and its inter-relation with the CPU forms no part of the present invention, being well-known to those of skill in this art. Those interested in obtaining more information on the organization and functional aspects of a cache memory are directed to the article by J. S. Liptay "Structural Aspects of the System/360 Model 85 — II The Cache" *IBM Systems Journal* Vol. 7 No. 1,968, pages 15–21. Another article of interest is "Evaluation Techniques for Storage Hierarchies" by J. Gecsei et al., *IBM Systems Journal* Vol. 9, No. 2, 1970, pages 78–91.

The advantage of this system over prior art page transfer systems lies in the speed of transfer of a page of data from the backing store 10 and in the fact that large amounts of data are transferred over a bus 47 which contains only enough signal lines for a single word. Parallel transfer of an entire page is not required. The speed of this design is derived from the use of the ring counter 32 which functions as a means for sequentially transferring each word contained in the fetch registers 16 from the output control circuit 18 along a narrow bus 47 to the cache. CPU 14 need call out only the first word through the address register 20; the associated words of the page in which the selected word is located are automatically and quickly transferred to the cache. As already alluded to, in the most advanced large capacity systems the backing store may have a one to two microsecond cycle time with an access time of about 500 nanoseconds. The ring counter 32 and the control devices 18 and 22, if designed for maximum speed, have a data rate in the order of 10–20 nanoseconds. Thus, an entire page of data may be transferred along the narrow bus 47 to the cache during a single cycle time of the backing store 10. Ring counter circuits which are useful in the present system are described in the text entitled "Manual of Logic Circuits" by G. A. Maley, Prentice-Hall, 1970, pp. 144 ff.

Figure 2A:
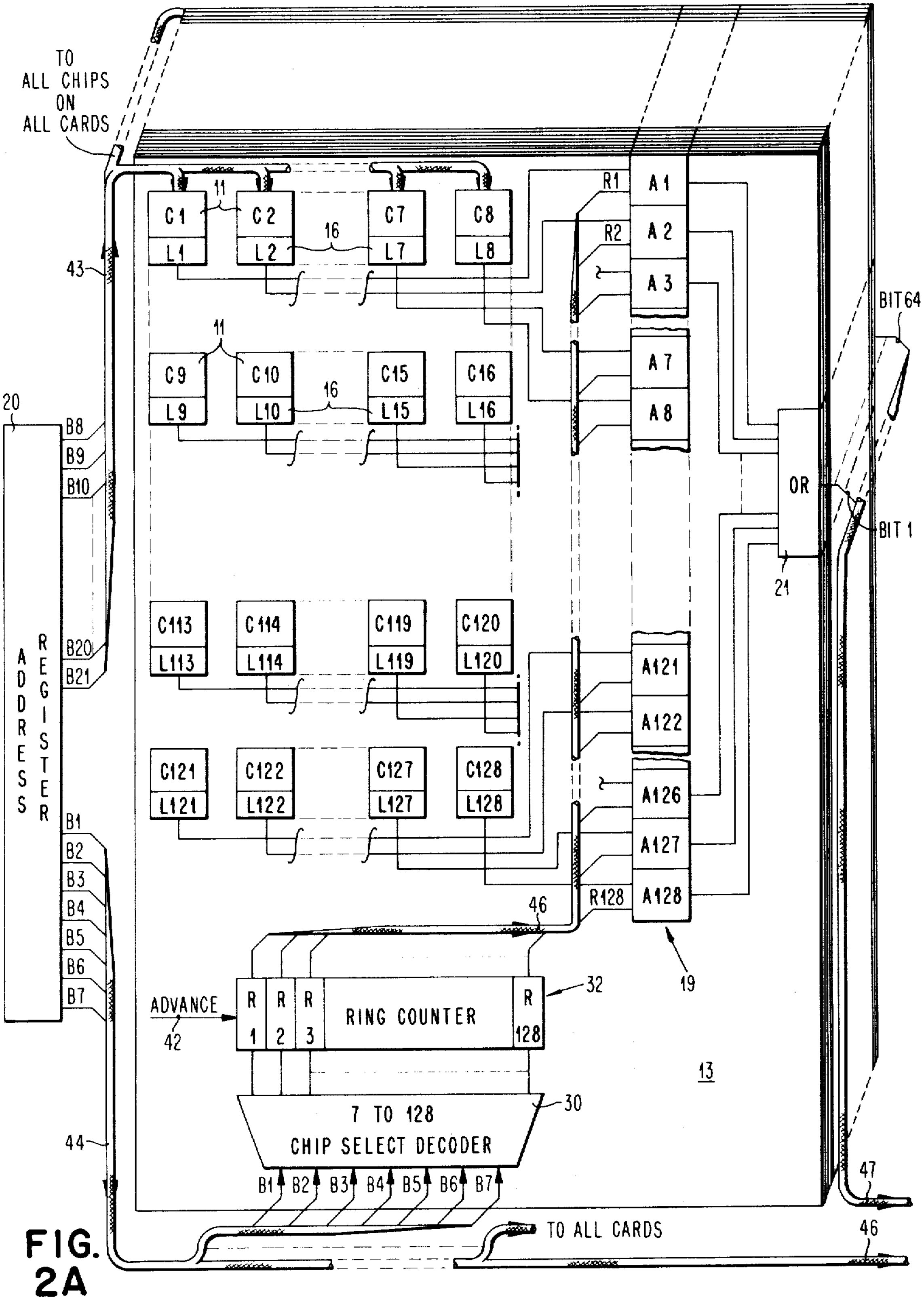
FIGS. 2A and 2B show a more detailed block diagram of the parts of the system in which the invention is embodied.
Figure 2B:
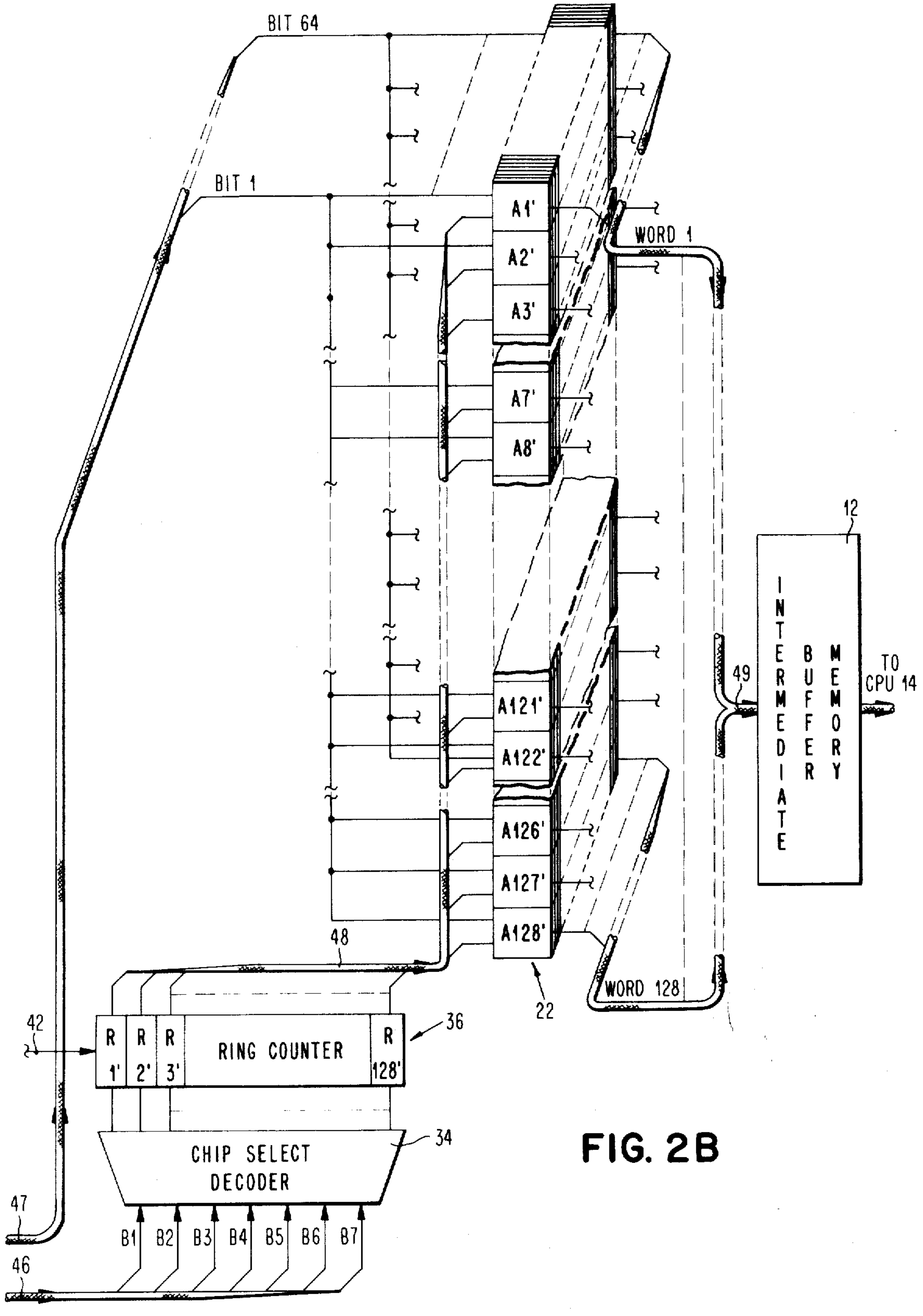

Turning now to FIGS. 2A and 2B, FIG. 2A illustrates a more detailed schematic of the preferred embodiment of the backing store 10. As illustrated, the backing store is a three dimensional semiconductor chip memory array comprising a series of cards 13 on which chips 11 are mounted. The preferred design of the memory contemplates having as many cards as there are bits in a word so that for a 64-bit word memory there are 64 cards in the backing store on which are mounted the semiconductor memory chips. A similar design is illustrated in U.S. Pat. No. 3,436,734 by J. H. Pomerene et al. which is assigned to the same assignee as the present application. In the preferred embodiment of this invention, each of the 64 cards has mounted thereon a ring counter 32 and chip select decoder 30 as well as the output control circuit 18. The output control circuit 18 of FIG. 1 comprises the array of AND gates 19 and an OR function block 21 on each card of FIG. 2A. In this way the memory is compact and signal delays are held to a minimum.

In the preferred embodiment contemplated by this invention each chip 11, identified sequentially as C1, C2 . . . C128, contains a 128 × 128 matrix of addressable memory locations to yield approximately 16,000 bits per chip and two million bits per card. It will be obvious that cards containing more or fewer chips or chips having a smaller or larger number of locations would be equally useful in the present invention. Each chip has associated therewith register means 16 which are identified sequentially as L1, L2 . . . L128. The register is preferably a conventional latch circuit the design of which is well-known to those of skill in this art, and which at the present state of the art may be fabricated on the same monolithic structure as the memory array in the chip. These latches are denoted as page fetch registers 16 which are illustrated in FIG. 1. The outputs B8, B9 . . . B21 from register 20 are connected to all chips throughout the memory and are decoded in the conventional way to select a single bit cell in the same relative location on each chip on all cards. Our invention also contemplates backing stores wherein a plurality of bits in a particular word are stored in chips on a single card. Also within the scope of our invention are systems in which more than one bit in a particular word is contained within the same chip. With any arrangement a request made by CPU 14 for a particular word causes a page of similarly located words to be addressed.

In the present embodiment, the outputs B1, B2 . . . B7 act as chip select signals which are decoded by chip select decoder 30, thereby specifying which of the 128 chips on each card has been initially selected by the CPU. For ease of illustration, bits B8 through B21 will be described as X and Y selection bits, whereas bits B1 through B7 are called chip select bits. All words addressed by register lines B8 to B21 are transferred to the latches 16 associated with each chip 11. The information signals temporarily stored in the latches are gated in sequence under control of the ring counter 32 through AND gates A1 through A128.

Thus as the ring counter 32 advances, a bit at a time is sequentially read from the latches 16. As this is done for the same bit location on each memory card 13, this means that a word at a time is transferred to OR function blocks 21 and through cable 47 to the buffer.

FIG. 2B illustrates the input control gates 22 as well as ring counter 36 and chip select decoder 34 which function to transfer the words of the page from bus 47 to the buffer memory 12. As was previously mentioned, the decoder 34 and ring counter 36 are not absolutely required for practicing the present invention. However, they do provide for flexibility in the design of the size of the Intermediate Buffer. The Buffer size may be reduced so as to correspondingly reduce the access time of the CPU.

It might be desirable in some systems to transfer less than one full page of data in one storage cycle. This would reduce the access time to the data in the backing store as well as reducing the size of the input control registers 22. If, for example, it were desired to transfer only one-half page of data during one storage cycle then ring counter 36 would be modified to step only 64 positions, rather than 128 positions, beginning with the starting address.

Figure 3:
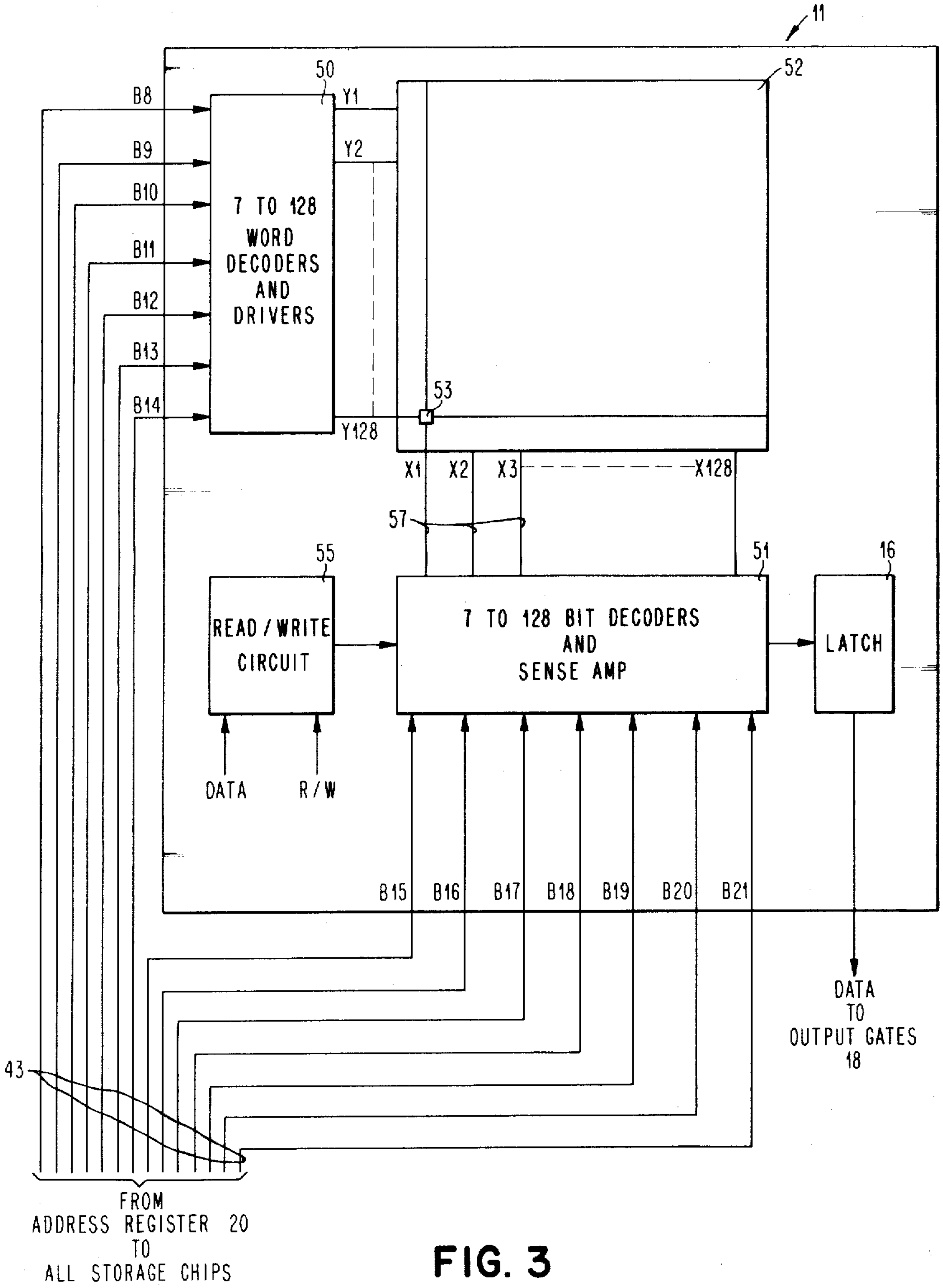
FIG. 3 is a detailed block diagram of one chip of the memory of FIGS. 1 and 2A.

Referring to FIG. 3 a single chip 11 is shown in more detail. Word decoder 50 and bit decoder 51 decode the outputs from the address register 20, resulting in the selection of a single bit from the chip at the intersection of the energized decoder output lines. When the appropriate X and Y lines are energized, read/write circuit 55 is energized and the data is sensed by a sense amplifier contained within decoder circuit 51 and temporarily stored in latch 16 which is connected to the output of the sense amplifier. The data in the latch is transferred to the output control gates 18 as previously described.

The details of the chip array, decoders, write circuitry and read circuits vary from memory to memory and therefore have not been shown in detail. A typical memory in which the invention may be embodied is shown in an article entitled "A High Performance LSI Memory System" by Richard W. Bryant et al. on pages 71–77 in the July 1970 issue of *Computer Design* magazine. Another memory design which would be useful in the present invention is the field effect transistor memory disclosed by R. H. Dennard in U.S. Pat. No. 3,387,286 which is assigned to the same assignee as the present application.

One significant difference between prior memory chips and the present design is the absence in the present design of the chip select circuitry on the chip itself. In the present invention, however, decoder 30 and ring counter 32, which are divorced from the individual chips, perform the function of chip select in that the ring counter sequentially gates data from each of the chips on each card into the output control circuit. Moreover, as previously alluded to, the ring counter operates independently of the central processor so that, once energized, it automatically gates the data from each of the chips in the memory in response to an advance signal from circuit 31.

OPERATION OF THE INVENTION

Having described the structure of the system in detail, the operation of the invention can now be profitably described. When the controls in the CPU 14 have initiated a fetch of a word contained in backing store 10 the X, Y and chip select bits are transferred to the address register 20 along address bus 41. The X and Y address bits emanate from the register on bit lines B8 through B21 and, as shown in FIG. 3, operate to select the same X, Y storage location in each chip on all cards. As the preferred system is arranged so that each of the 64 cards in the storage system represents one and only one bit position of a data word, and there are 128 locations on each card selected, this means that 128 64-bit words are initially addressed by address register 20 through cabling 43.

The particular word called out by the CPU is identified by bits B1 through B7 (in conjunction with bits B8 through B21) which activate the chip select decoder 30 mounted on each card. The output of the chip select decoder actuates the corresponding input of ring counter 32. For example, assume that the CPU had called for the fetch of the 64-bit word at storage location 0, 0 contained in chips C8 on all 64 of the memory cards 13. Location R8 of the ring counter on each card 13 is energized and the word is gated from latch L8 through gate A8 of the output control register 18. The 64 bit word is transferred from the output control gates A8 through the OR function blocks 21 on each card into bus 47 to be stored in cache 12. To implement the transfer of the entire page associated with the word fetched by the CPU, the advance signal on line 42 shifts the bit in location R8 of the ring counter to R9, thereby calling out the word in chips C9 through the appropriate gate A9 and so on to the cache. This continues until all of the words in the page are transferred sequentially along bus 47 to be stored in the cache. Chip select decoder 34 and ring counter 36 perform the corresponding functions for storing each sequentially transferred word in the appropriate gates in input control 22 for transfer to the storage register of the buffer memory.

MODIFICATIONS

Various changes can be made in the above described preferred embodiment which would occur to those of skill in the art. For example, it is obvious that additional bits in the word could be used in an operative system for error detection and correction. Additional cards would be necessary, each card being identified with one and only one bit position of the ECC code attached to the processing system data word. The output of the ECC bits would be tested to determine if the page in as stored in the output control register 18 were valid. If the page were in error, steps such as "correct single errors" "reread page" or "machine check indication" could be made at this time prior to transfer of the cache.

As illustrated in FIG. 1, the buffer is associated with a storage register 24 and a fetch register 26. If the backing store 10 also had a storage and fetch register it would be possible to overlap storage/fetch cycles; and once the referenced page is latched in fetch registers 16, backing store 10 is free to accept storage cycles. Moreover, while the same page is being assembled in the buffer storage register 24, the buffer is free to accept fetch cycles.

It should also be clear that the present invention is not limited to a single intermediate buffer. In very large systems it might be more economical to include two or more buffers between the backing store and the CPU, operating in the same fashion as described. This would allow a large page to be transferred from the backing store to the first intermediate buffer and a second smaller page to be transferred to the buffer associated with the CPU. This would reduce the effect of access time and allow the CPU to continue processing while the rest of the larger page is transferred in very high performance systems. Other organizations could easily be configured because of the built-in flexibility which results from the separation of the buffer from the backing store.

While the invention has been particularly shown and described with reference to a preferred embodiment thereof, it will be understood by those of skill in the art that the foregoing and other changes in form and details may be made therein without departing from the spirit and scope of the inveniton.

We claim:

1. A hierarchical memory system comprising:

a buffer store;

a backing store containing data block storage locations having sets of associated plural bit binary words, each said set representing a page of data;

addressing means, responsive to a request from a central processor for a selected word, for specifying locations in the backing store containing said selected word;

fetch register means having first input lines connected to the data outputs of said backing store for temporarily storing said page of data which includes said selected word;

decoder means, responsive to said addressing means having a first set of outputs for reading said page of data from said backing store into said fetch register means, and having a second set of outputs for selecting the fetch register locations containing said selected word;

means connected to the second set of outputs of said decoder means for first transferring said selected word and subsequently transferring the other words in said page in sequence from said register means into said buffer.

2. A hierarchical memory system as in claim 1 wherein said transferring means includes:

output control means having inputs connected to outputs of said fetch register means; and means for sequentially gating a word at a time from said register means and through said control means to said buffer.

3. A hierarchical memory system as in claim 2 wherein said sequential gating means comprises:

ring circuit means for initially gating said CPU-selected word and subsequently gating said associated words.

4. A hierarchical memory system as in claim 3 further including:

advance control means for advancing said ring circuit means in accordance with a signal from the backing storage control.

5. A system as in claim 4 wherein said advance control means advances said ring circuit means at a rate so as to gate all of said words from said output control means during one cycle interval of said backing store.

6. A hierarchical memory system as in claim 1 wherein said backing store comprises:

a plurality of memory modules, each of which have mounted thereon a set of semiconductor storage devices; and wherein said decoder means selects the same relative address locations in each said memory module.

7. A system as in claim 6 wherein there is one memory module for each bit in a binary word.

8. A system as in claim 2 further comprising:

a one-word-wide bus for communicating words gated through said output control means;

input control means having input lines connected to said bus and having output lines connected to the input of said buffer for receiving words from said bus; and means for sequentially gating a word at a time from said input control means to said buffer.

9. A system as in claim 8 wherein said sequential gating means from said register means and from said input control means both comprise:

ring circuit means for initially gating said CPU selected word and subsequently gating said associated words.

10. A system as in claim 9 further including:

advance control means for advancing both said ring circuit means in synchronism in accordance with a signal from the backing storage control.

11. A system as in claim 10 wherein said advance control means advances both said ring circuit means at a rate so as to gate all of said words from said backing store to said buffer during one cycle interval of said backing store.

12. A hierarchical memory system comprising a central processor, a cache store and a backing store which includes a plurality of cards, each card having mounted thereon a set of semiconductor devices, there being one card for each bit in a data word, and further comprising:

address register means for selecting a particular storage location in one of said semiconductor devices on each card in response to a request for a data word from said central processor;

fetch register means having first input lines connected to the data outputs of each said semiconductor device;

first decoder means responsive to said address register means for reading information in parallel into said fetch registers from said particular storage locations and from the same relative storage locations in each of said semiconductor devices on all cards, said fetch registers thereby storing a page of data words containing said requested word and words associated with said requested word;

second decoder means responsive to said address register means for selecting the semiconductor device on each card which stores the bits in said requested word; and means connected to the outputs of said second decoder means for first transferring said requested word and subsequently transferring said associated words in sequence from said fetch registers into said cache store.

13. A hierarchical memory system as in claim 12 wherein said transferring means includes:

output control means connected to the outputs of said fetch register means; and ring circuit means for initially gating said requested word and subsequently gating said associated words.

14. A hierarchical memory system as in claim 13 further including:

advance control means for advancing said ring circuit means in accordance with a signal from the backing storage control.

15. A system as in claim 14 wherein said advance control means advances said ring circuit means at a rate so as to gate all of said words during one cycle interval of said backing store.

* * * * *